(12) United States Patent  (10) Patent No.: US 8,571,478 B2
Ejima  (45) Date of Patent: Oct. 29, 2013

(54) WIRELESS USB DEVICE AND WIRELESS USB COMMUNICATION SYSTEM

(75) Inventor: Takeshi Ejima, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 300 days.

(21) Appl. No.: 13/002,790

(22) PCT Filed: Jun. 26, 2009

(86) PCT No.: PCT/JP2009/062175
§ 371 (c)(1),
(2), (4) Date: Jan. 6, 2011

(87) PCT Pub. No.: WO2010/004933
PCT Pub. Date: Jan. 14, 2010

(65) Prior Publication Data
US 2011/0130097 A1    Jun. 2, 2011

(30) Foreign Application Priority Data

Jul. 8, 2008   (JP) .................................. 2008-178148

(51) Int. Cl.
*H04B 7/00*   (2006.01)
(52) U.S. Cl.
USPC ...... 455/41.2; 455/466; 455/550.1; 455/63.1; 455/557; 710/305; 710/313; 709/202; 709/238; 709/249; 370/208; 370/388
(58) Field of Classification Search
USPC .................. 455/41.2, 466, 550.1, 557, 63.1; 710/305, 306, 313, 106, 15; 726/3, 9; 709/249, 238, 202, 203; 370/338, 208
See application file for complete search history.

(56) References Cited

U.S. PATENT DOCUMENTS

| 7,478,188 | B2 * | 1/2009 | Patton | 710/300 |
| 7,664,899 | B2 * | 2/2010 | Kimura | 710/106 |
| 7,689,753 | B2 * | 3/2010 | Kwak et al. | 710/305 |
| 7,802,047 | B2 * | 9/2010 | Chung et al. | 710/313 |
| 7,859,989 | B2 * | 12/2010 | Kim et al. | 370/208 |

(Continued)

FOREIGN PATENT DOCUMENTS

| EP | 1 870 819 A1 | 12/2007 |
| JP | 2003 167837 | 6/2003 |

(Continued)

OTHER PUBLICATIONS

International Search Report issued Oct. 6, 2009 in PCT/JP09/62175 filed Jun. 26, 2009.

(Continued)

*Primary Examiner* — Marceau Milord
(74) *Attorney, Agent, or Firm* — Oblon, Spivak, McClelland, Maier & Neustadt, L.L.P.

(57) ABSTRACT

A wireless USB device that performs a communication conforming to a wireless USB standard with a plurality of wireless USB hosts includes a reception-time-information receiving unit that receives reception time information indicating a data reception time specified by each of the wireless USB hosts, a configuration determining unit that determines, when the reception-time-information receiving unit receives the reception time information from a wireless USB host, whether a configuration is set for the wireless USB host, and a configuration unit that sets, when the configuration determining unit determines that the configuration is not set for the wireless USB host that transmitted the reception time information, the configuration for the wireless USB host that transmitted the reception time information.

15 Claims, 14 Drawing Sheets

(56) References Cited

U.S. PATENT DOCUMENTS

| | | | |
|---|---|---|---|
| 7,890,683 B2 * | 2/2011 | Kimura | 710/106 |
| 8,065,462 B2 * | 11/2011 | Chan et al. | 710/313 |
| 8,364,083 B2 * | 1/2013 | Baek et al. | 455/41.3 |
| 2005/0266798 A1 * | 12/2005 | Moloney et al. | 455/41.2 |
| 2006/0149858 A1 * | 7/2006 | Bhesania et al. | 710/5 |
| 2006/0195552 A1 | 8/2006 | Nampei | |
| 2006/0203790 A1 | 9/2006 | Hong et al. | |
| 2007/0038784 A1 | 2/2007 | Sung et al. | |
| 2007/0073935 A1 * | 3/2007 | Kim et al. | 710/62 |
| 2007/0260801 A1 * | 11/2007 | Kwak et al. | 710/305 |
| 2007/0300004 A1 | 12/2007 | Yun | |
| 2008/0130553 A1 | 6/2008 | Takahashi | |

FOREIGN PATENT DOCUMENTS

| | | |
|---|---|---|
| JP | 3742367 | 2/2006 |
| JP | 2006 268845 | 10/2006 |
| JP | 2007 293708 | 11/2007 |
| JP | 2007 306057 | 11/2007 |
| JP | 2008 17446 | 1/2008 |
| JP | 2008 46970 | 2/2008 |
| JP | 2008 72241 | 3/2008 |
| JP | 2008 117289 | 5/2008 |
| JP | 2008 118275 | 5/2008 |
| WO | WO 01/31459 A1 | 5/2001 |
| WO | WO 2007/018365 A1 | 2/2007 |
| WO | WO 2007/148372 | 12/2007 |

OTHER PUBLICATIONS

Extended Search Report issued Jul. 2, 2012 in European Application No. 09794378.1.
Intel, "Wireless USB the first High-Speed Personal Wireless Interconnect", The Intel Developer, XP 008132935, Feb. 17, 2004, pp. 1-8.
"Wireless Universal Serial BUS Specification Revision 1.0", URL [http://www.usb.org/wusb/docs/WirelessUSBSpecification_r10.pdf], Wireless Universal BUS Specification, XX, XX, XP002337517, May 12, 2005, 303 pages.
"Universal Serial BUS Specification Revision 2.0", URL [http:www.poweredusb.org/pdf/usb20.pdf], Universal Serial BUS Specification, Apr. 27, 2000, 650 pages.
Office Action mailed Jun. 4, 2013, in Japanese Patent Application No. 2008-178148, filed Jul. 8, 2008(2 pages).
Taiwanese Office Action dated Jun. 17, 2013, with an English translation.

* cited by examiner

FIG.5

| Host Address (2 BYTES) | CHID (16 BYTES) | PTK (16 BYTES) | Device Address (2 BYTES) | bConfigurationValue (2 BYTES) |
|---|---|---|---|---|
| 0x10F2 | 0x1122334455566···F | 0xA73EF1209E···73 | 0x0003 | 0x0001 |
| 0xF373 | 0x21436587A9CB···FE | 0xF573C8293E···E2 | 0x0001 | 0x0001 |
| 0xA36E | 0x3333444455555···22 | 0x45CBA3A52D···76 | 0x0003 | 0x0002 |
| 0x55E2 | 0x405060708090···30 | 0xD3E8B232AF···4A | 0x0002 | 0x0001 |
| 0x807D | 0x5556666777888···AA | 0xB93EA6E219···C1 | 0x0001 | 0x0001 |
| ... | ... | ... | ... | ... |

WIRELESS USB DEVICE AND WIRELESS USB COMMUNICATION SYSTEM

TECHNICAL FIELD

The present invention relates to a wireless USB device and a wireless USB communication system, and more particularly, to a wireless USB device that performs communication with a plurality of wireless USB hosts conforming to a wireless USB standard and a wireless USB communication system.

BACKGROUND ART

Wireless universal serial bus (USB) is a technical standard obtained by extending USB widely spread as a wire communication standard for a short-range communication so that usability of wireless communication is achieved while security and high speed processing of a wire communication are ensured, and a specification of the wireless USB is formulated by the Wireless USB Promoter Group that is a lower organization of the USB Implementers Forum (USB-IF).

The wireless USB employs ultra-wideband (UWB) technology as a wireless technology. The UWB is a wireless communication system using a broad frequency bandwidth of 7.5 gigahertz (GHz) from 3.1 GHz to 10.6 GHz. Physical layers of the UWB have been standardized by the Institute of Electrical and Electronics Engineers (IEEE) that formulates standards according to the IEEE 802.15.3a.

Two modulation systems, i.e., a Direct Spread-UWB (DS-UWB) system and a Multiband-Orthogonal Frequency Division Multiplexing (MB-OFDM) system, are used for the physical layers of the UWB.

In the DS-UWB system, two bands (dual band), i.e., a low band from 3.1 GHz to 4.9 GHz and a high band from 6.2 GHz to 9.7 GHz are used. A signal is transmitted after Quadrature Phase Shift Keying (QPSK) or Binary Phase Shift Keying (BPSK) is performed as primary modulation and Code Division Multiple Access (CDMA) is performed as secondary modulation. Furthermore, the DS-UWB system employs Direct Sequence Spread Spectrum to transmit a signal.

In the MB-OFDM system, a bandwidth from 3.1 GHz to 10.6 GHz is divided into 14 bands (frequency bands). A signal is transmitted after the QPSK is performed on each of the bands as primary modulation to carry a digital signal on a radio wave and OFDM modulation is performed as secondary modulation to achieve communication that can tolerate interference with a different radio wave. WiMedia PHY is formulated by the WiMedia Alliance as a standard for a physical (PHY) layer using the MB-OFDM.

A transmission power level is controlled in the UWB by using the above modulation systems. Specifically, the Federal Communications Commission (FCC) defines that an equivalent isotropically radiated power (EIRP) indicating a regulation value of the transmission power level per 1 megahertz (MHz) in the UWB is set to less than −41.25 dBm. It can be converted into about 0.5 milliwatt (mW) in terms of total electric power, and it is about one twentieth of total electric power of a Personal Handy-phone System (PHS).

WiMedia MAC is formulated by the WiMedia Alliance as a protocol for a Media Access Control (MAC) layer. Thus, the wireless USB conforms to a USB technology based on the USB Specification Revision 2.0 formulated by the USB-IF in addition to a wireless technology such as the WiMedia PHY and the WiMedia MAC. Therefore, if the wireless USB performs communication within a range of less than three meters, the wireless USB can transmit data at 480 megabits per second (Mbps) that is a maximum data transfer rate according to the USB Specification Revision 2.0.

Because the wireless USB has low transmission power that is a characteristic of the UWB, it is considered that the wireless USB is used in a Personal Area Network (PAN) in which it is assumed that a radio wave range is less than 10 meters. Therefore, it is possible to provide a communication technology with less risk of eavesdropping that often occurs in a wireless local area network (LAN) and with high security.

As described above, compared with the wireless LAN, the wireless USB has characteristics of higher speed processing and higher security, and therefore the wireless USB has attracted attentions as a next-generation wireless technology to be used at an office.

However, a communication type of the wireless USB is a hub-and-spoke type including a wireless USB host playing a central part and up to 127 wireless USB devices to be controlled by the wireless USB host. Specifically, each of the wireless USB devices is controlled by one wireless USB host.

Therefore, if the wireless USB technology is used without modification, a plurality of personal computers (PCs) serving as the wireless USB hosts cannot share one printer serving as the wireless USB device.

For example, Japanese Patent Application Laid-open No. 2007-306057 discloses a technology in which if the wireless USB device performs communication with a wireless USB host when a different wireless USB host reserves a medium access slot (MAS) for transmitting data on the WiMedia MAC, the wireless USB device switches the wireless USB host with which the wireless USB device 5 performs communication.

Japanese Patent Application Laid-open No. 2007-293708 discloses a technology in which a wireless USB device includes the same number of controllers and buffers called end-points as that of connectable wireless USB hosts, so that the number of the wireless USB hosts that can perform communication with one wireless USB device is physically increased.

The Wireless USB Specification Revision 1.0 created by the Wireless USB Promoter Group defines that a wireless USB host periodically continues to transmit a Micro-scheduled Management Command (MMC) packet that is a control packet.

The MMC packet can contain a connection host identifier (CHID) in 16 bytes that is identification information for identifying the wireless USB host, information about time when the wireless USB host transmits data to a wireless USB device, information about time when the wireless USB device transmits data to the wireless USB host, device control information, and the like, as an information element.

The USB Specification Revision 2.0 defines that a USB device includes at least one configuration descriptor. If the wireless USB device includes a plurality of configuration descriptors, a wireless USB host determines which configuration is to be applied to the wireless USB device.

Therefore, in the technology disclosed in Japanese Patent Application Laid-open No. 2007-306057, there is no guarantee that each of the wireless USB hosts desires the same configuration to be applied to the wireless USB device, and as a result, there can be mismatch of the configuration, i.e., the configuration applied to the wireless USB device is not a desired one for a wireless USB host.

Furthermore, in the technology disclosed in Japanese Patent Application Laid-open No. 2007-293708, because the wireless USB device needs to include the same number of the controllers and the end-points as that of the wireless USB hosts, a circuit size is increased.

The present invention is made to solve the above problems, and has an object to provide a wireless USB device and a wireless USB communication system that can prevent mismatch of the configuration with respect to each of the wireless USB hosts without increasing a circuit size in the wireless USB device.

DISCLOSURE OF INVENTION

According to one aspect of the present invention, there is provided a wireless USB device that performs a communication conforming to a wireless USB standard with a plurality of wireless USB hosts. The wireless USB device includes a reception-time-information receiving unit that receives reception time information indicating a data reception time specified by each of the wireless USB hosts; a configuration determining unit that determines, when the reception-time-information receiving unit receives the reception time information from a wireless USB host, whether a configuration is set for the wireless USB host that transmitted the reception time information; and a configuration unit that sets, when the configuration determining unit determines that the configuration is not set for the wireless USB host that transmitted the reception time information, the configuration for the wireless USB host that transmitted the reception time information.

Furthermore, according to another aspect of the present invention, there is provided a wireless USB communication system including a plurality of wireless USB hosts and a wireless USB device that performs a communication conforming to a wireless USB standard with the wireless USB hosts. The wireless USB device includes a reception-time-information receiving unit that receives reception time information indicating a data reception time specified by each of the wireless USB hosts, a configuration determining unit that determines, when the reception-time-information receiving unit receives the reception time information from a wireless USB host, whether a configuration is set for the wireless USB host that transmitted the reception time information, a configuration unit that sets, when the configuration determining unit determines that the configuration is not set for the wireless USB host that transmitted the reception time information, the configuration for the wireless USB host that transmitted the reception time information, a data receiving unit that receives data from each of the wireless USB hosts, and a host standby unit that causes, when the reception-time-information receiving unit receives the reception time information from a first wireless USB host while the data receiving unit receives data from a second wireless USB host, the first wireless USB host to standby until the data receiving unit completes receiving the data from the second wireless USB host. The first wireless USB host holds data to be transmitted to the wireless USB device while the host standby unit causes the first wireless USB host to standby.

BRIEF DESCRIPTION OF DRAWINGS

FIG. 5 is a table for explaining data about the wireless USB hosts as configuration targets stored in a memory shown in FIG. 2;

BEST MODE(S) FOR CARRYING OUT THE INVENTION

Exemplary embodiments of the present invention will be explained in detail below with reference to the accompanying drawings.

Figure 1:
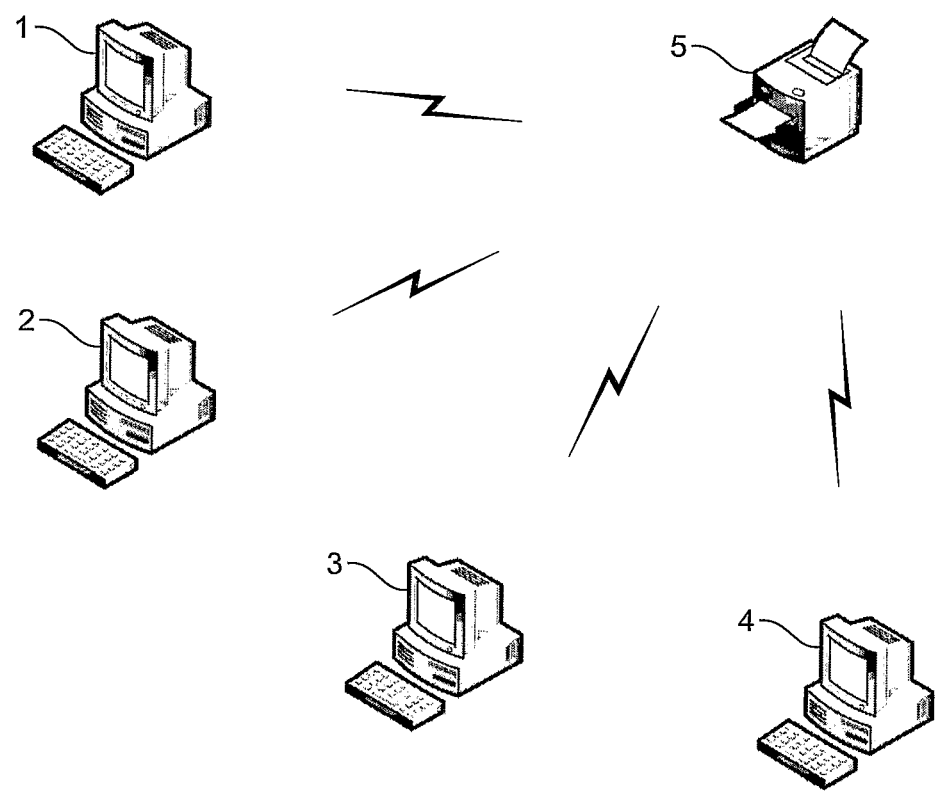
FIG. 1 is a schematic diagram of a wireless USB communication system according to a first embodiment of the present invention.

FIG. 1 is a schematic diagram of a wireless USB communication system according to a first embodiment of the present invention.

The wireless USB communication system includes a plurality of wireless USB hosts 1 to 4 and a wireless USB device 5 that performs communication with the wireless USB hosts 1 to 4 in conformity to the wireless USB standard.

Although the four wireless USB hosts 1 to 4 and the wireless USB device 5 are shown in FIG. 1, the numbers of the wireless USB hosts and the wireless USB devices to be included in the wireless USB communication system are not limited to the above.

For example, each of the wireless USB hosts 1 to 4 is configured by a personal computer (PC) having a wireless communication module that can perform communication in conformity to the wireless USB standard, and the wireless USB device 5 is configured by a printer or a multifunction product (MFP).

Figure 2:
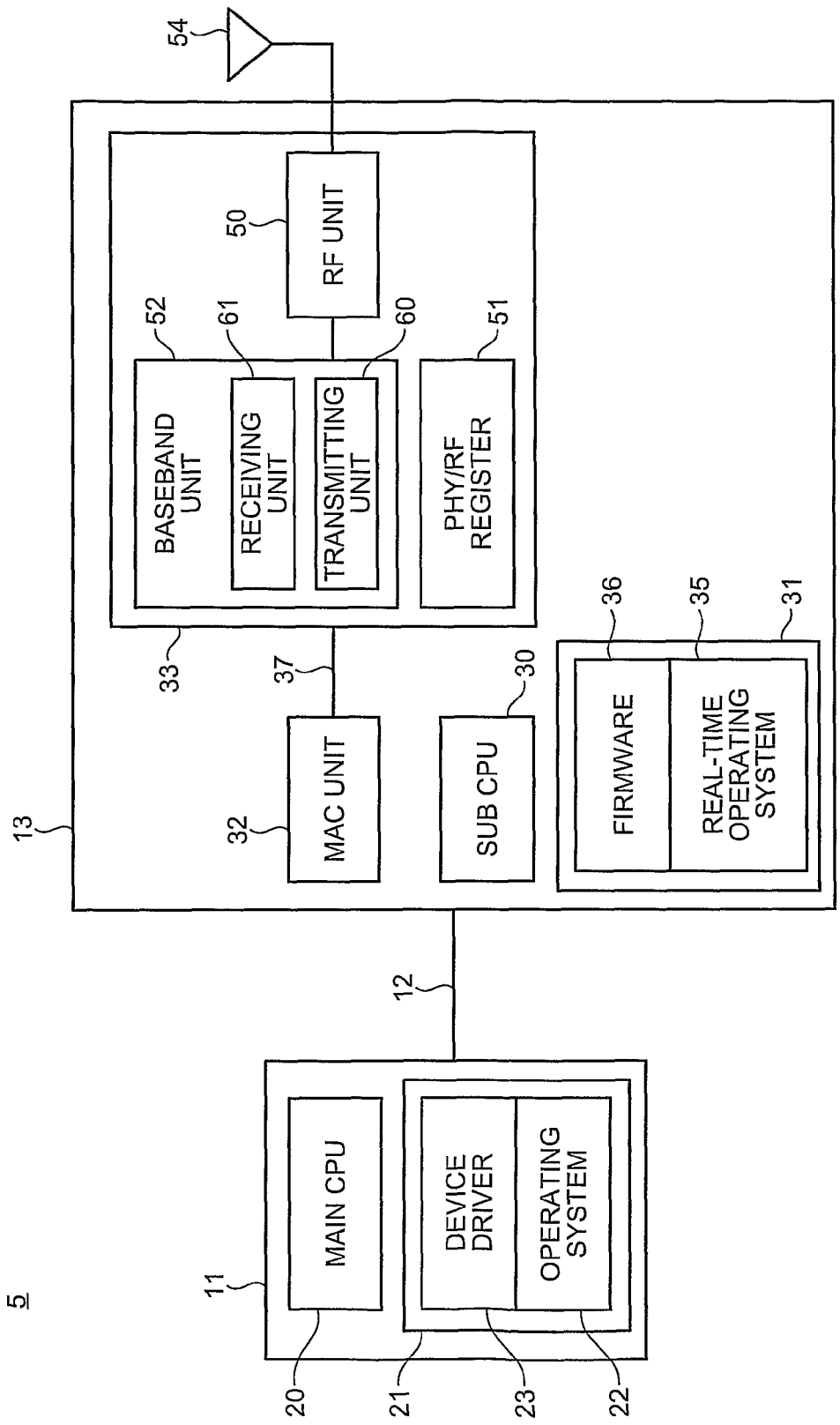
FIG. 2 is a block diagram of a wireless USB device shown in FIG. 1.

FIG. 2 is a block diagram of the wireless USB device 5. The wireless USB device 5 includes a host controller unit 11 and a device unit 13 that is connected to the host controller unit 11 via a PCI-Express bus 12.

The host controller unit 11 includes a main central processing unit (CPU) 20 and a memory 21. The main CPU 20, by using the memory 21, executes an operating system 22, and executes a device driver 23 on the operating system 22.

The device driver 23 transmits and receives data to and from the device unit 13 via the PCI-Express bus 12, and writes and reads a value to and from a register (not shown) included in a media access controller (MAC) unit 32 thereby controlling the device unit 13.

The device unit 13 includes a sub CPU 30, a memory 31, the MAC unit 32, a physical layer (PHY) unit 33, and an antenna 54. The MAC unit 32 generates a data frame and performs processing such as data frame filtering. The PHY unit 33 performs signal processing such as frequency transform.

The sub CPU 30, by using the memory 31, executes a real-time operating system 35, and executes firmware 36 on the real-time operating system 35 thereby controlling each unit included in the MAC unit 32.

The sub CPU 30 executing the firmware 36 specifies settings in the register included in the MAC unit 32 and transmits and receives data to and from the host controller unit 11. Furthermore, the sub CPU 30 executing the firmware 36 writes and reads a value to and from a PHY/radio frequency (RF) register 51 included in the PHY unit 33 via a WiMedia MAC-PHY interface (I/F) bus 37.

Each of the MAC unit 32 and the PHY unit 33 performs processing based on each of standards for the WiMedia MAC and the WiMedia PHY. Communication performed between the MAC unit 32 and the PHY unit 33 is defined according to WiMedia MAC-PHY I/F specification. Therefore, it is possible to connect the MAC unit 32 and the PHY unit 33 manufactured by different vendors to each other.

The MAC unit 32 adds an MAC header to a data frame to be sent to the PHY unit 33, encrypts the data frame with the MAC header added, and transmits the encrypted data frame to the PHY unit 33 via the WiMedia MAC-PHY I/F bus 37.

Moreover, the MAC unit 32 decrypts data frame received from the PHY unit 33, analyzes the decrypted data frame, and executes filtering on data to be sent to a higher protocol among data obtained from the data frame based on an analysis result.

The PHY unit 33 includes an RF unit 50, the PHY/RF register 51, and a baseband unit 52. The baseband unit 52 includes a transmitting unit 60 and a receiving unit 61.

The RF unit 50 performs MB-OFDM modulation on a baseband signal received from the transmitting unit 60, and then transmits the modulated signal as a radio wave in the air via the antenna 54.

The RF unit 50 demodulates a signal received by the antenna 54 on which the MB-OFDM modulation has been performed into a baseband signal, and outputs the demodulated baseband signal to the receiving unit 61.

The transmitting unit 60 performs digital-analog (D/A) conversion on a digital data frame received from the MAC unit 32 via the WiMedia MAC-PHY I/F bus 37 to generate an analog baseband signal, and outputs the generated baseband signal to the RF unit 50.

The receiving unit 61 performs analog-digital (A/D) conversion on a baseband signal received from the RF unit 50 to generate a digital data frame, and transmits the generated data frame to the MAC unit 32 via the WiMedia MAC-PHY I/F bus 37.

The MAC unit 32, the PHY unit 33, and the antenna 54 correspond to a reception-time-information receiving unit and a transmission-time-information receiving unit according to the present invention. The sub CPU 30 executing the firmware 36 operates the wireless USB device 5 as describe later, and corresponds to a configuration determining unit, a configuration unit, a configuration-information reply unit, an encrypting unit, a host standby unit, a host detecting unit, and a host authenticating unit according to the present invention.

The sub CPU 30 executing the firmware 36, the MAC unit 32, the PHY unit 33, and the antenna 54 correspond to a device-address receiving unit according to the present invention. The memory 31 corresponds to a configuration-information storage unit according to the present invention.

Figure 3:
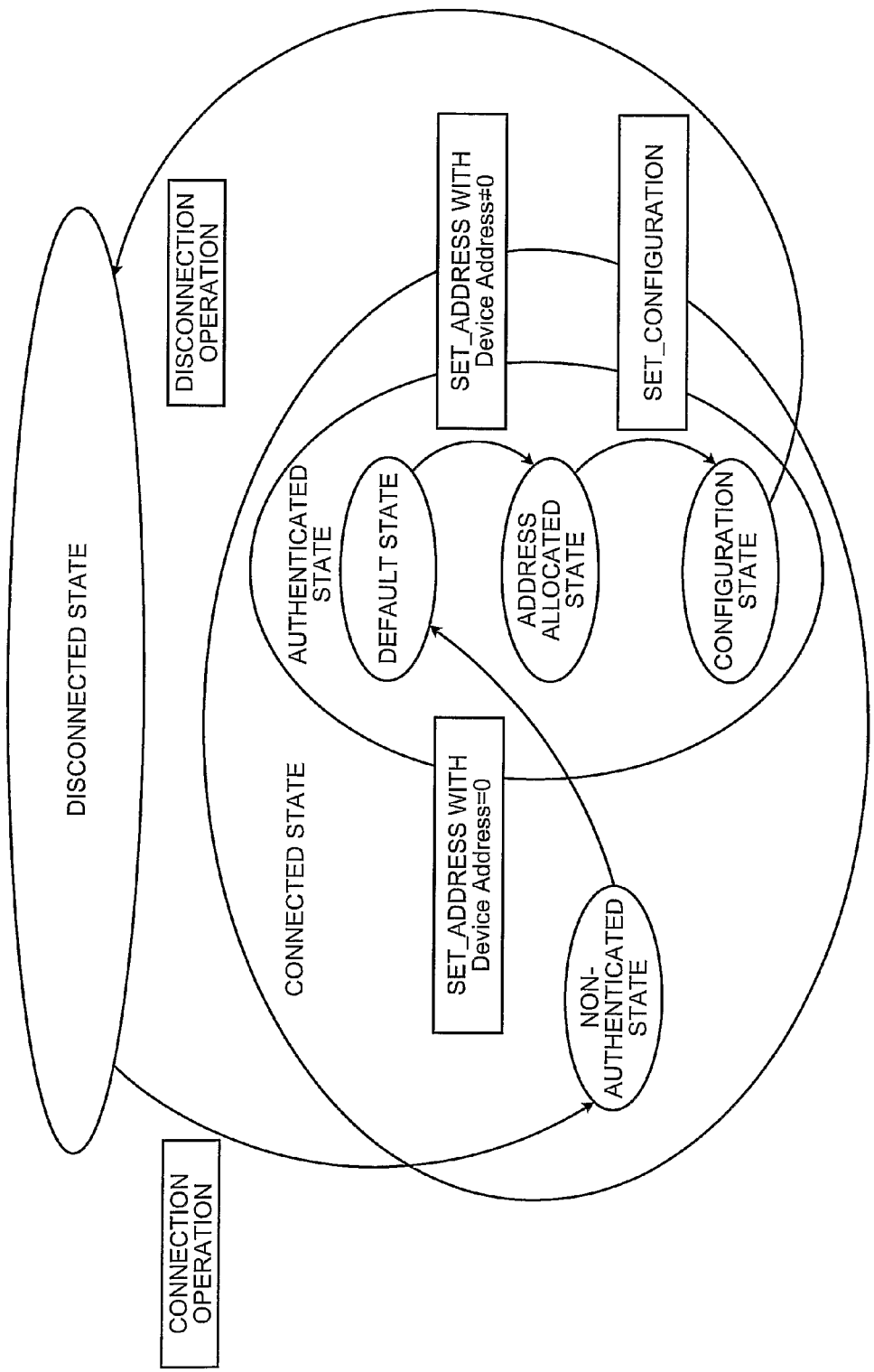
FIG. 3 is a state transition diagram for explaining state transition of the wireless USB device extracted from a state transition diagram according to the Wireless USB Specification Revision 1.0.

FIG. 3 is a state transition diagram for explaining state transition of the wireless USB device 5 extracted from a state transition diagram according to the Wireless USB Specification Revision 1.0.

In the following description, any of the wireless USB hosts 1 to 4 that performs communication with the wireless USB device 5 is simply referred to as "wireless USB host".

The wireless USB device 5 needs to set configuration as specified by the wireless USB host, so that the wireless USB device 5 enters a state where the wireless USB device 5 can perform communication with the wireless USB host.

Setting the configuration means that the wireless USB device 5 is configured as specified by the wireless USB host, so that communication can be performed between the wireless USB host and the wireless USB device 5.

Specifically, setting the configuration means that the wireless USB device 5 sets an attribute, information about a driver, a packet size, or an end-point, as specified by the wireless USB host.

The state of the wireless USB device 5 transits from a disconnected state to an authenticated state via a standby state with respect to the wireless USB host. At the authenticated state, a state of the wireless USB device 5 transits from a default state to a configuration state via an address allocated state.

Data passing between the wireless USB host and the wireless USB device 5 until the wireless USB device 5 sets the configuration and the state transition of the wireless USB device 5 are performed in conformity to the Wireless USB Specification Revision 1.0.

Figure 4:
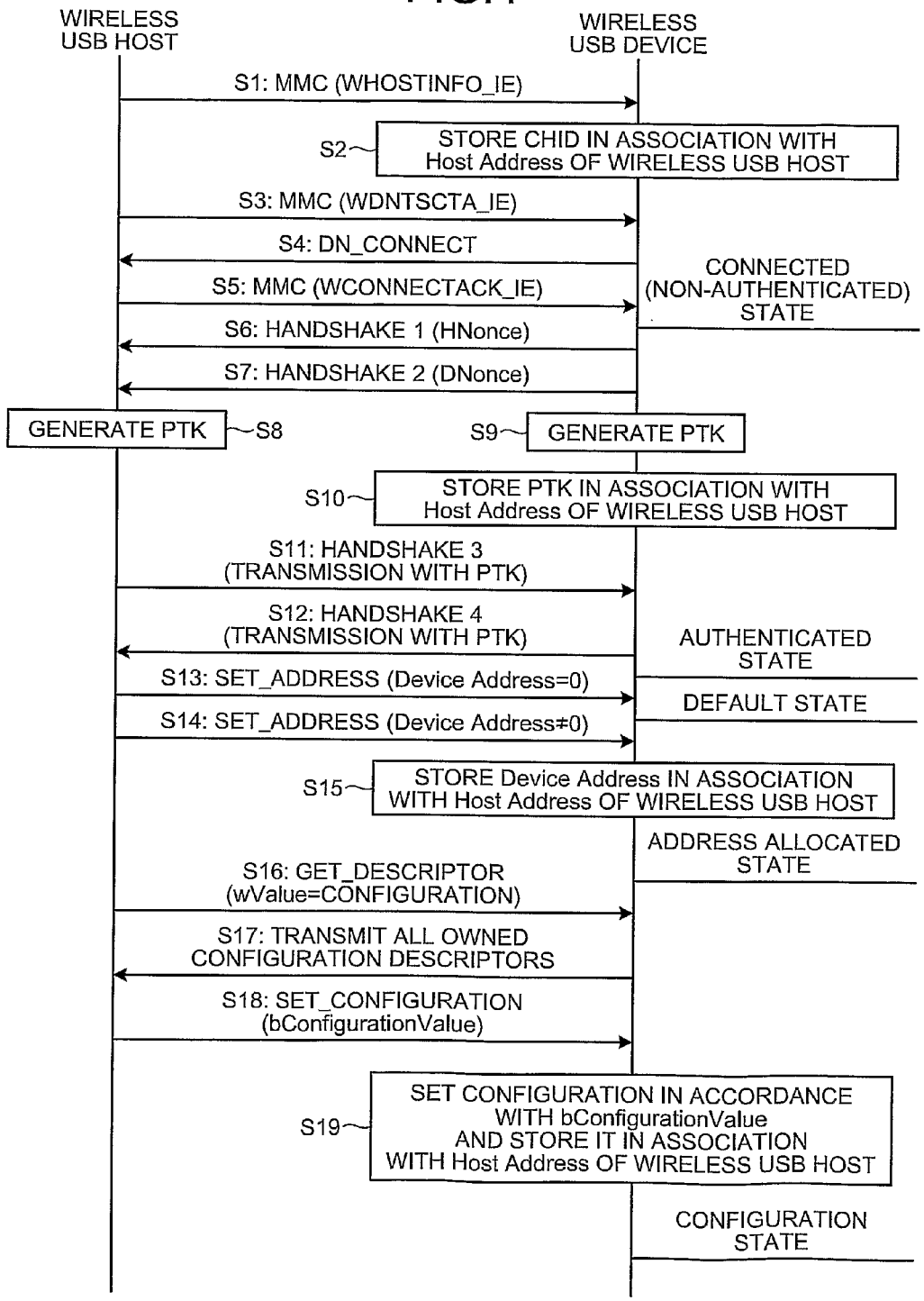
FIG. 4 is a sequence diagram for explaining the state transition of the wireless USB device from a disconnected state to a configuration state with respect to a wireless USB host shown in FIG. 1.

FIG. 4 is a sequence diagram for explaining the state transition of the wireless USB device 5 from the disconnected state to the configuration state with respect to the wireless USB host.

The wireless USB host transmits the MMC packet containing WHOSTINFO_IE indicating information about the wireless USB host as an information element to the wireless USB device 5 (Step S1).

Upon receiving the MMC packet, the wireless USB device 5 determines whether the CHID contained in the WHOSTINFO_IE is the CHID of a connectable wireless USB host.

The wireless USB device 5 determines whether the wireless USB host is connectable based on whether the wireless USB device 5 and the wireless USB host share a connection context (CC) including the CHID in advance by using any of a numeric association model and a cable association model.

The numeric association model and the cable association model are defined according to the Wireless USB Association Models Specification 1.0 created by the USB-IF.

In the numeric association model, a unique numeric value owned by the wireless USB device 5 is input to the wireless USB host so that the CC is shared by the wireless USB device 5 and the wireless USB host. In the cable association model, the wireless USB host and the wireless USB device 5 are connected to each other via a wired USB cable so that the CC is shared by the wireless USB host and the wireless USB device 5.

The CC includes a connection device identifier (CDID) for identifying the wireless USB device 5 and a connection key (CK) based on which an encryption key required for a subsequent authentication process is to be generated as well as the CHID. Each of the CHID, the CDID, and the CK is expressed in 16 bytes.

If it is determined that the wireless USB host is connectable, the wireless USB device 5 stores the CHID of the wireless USB host in the memory 31 in association with a Host Address of the wireless USB host (Step S2).

The wireless USB host transmits the MMC packet containing WDNTSCTA_IE indicating a time when the wireless USB device 5 transmits a small-sized notification message asynchronously (for example, a time slot number) as the information element to the wireless USB device 5 (Step S3). The WDNTSCTA_IE corresponds to transmission time information according to the present invention.

Upon receiving the MMC packet, the wireless USB device 5 transmits a DN_CONNECT message indicating a connection request to the wireless USB host at a time indicated by the WDNTSCTA_IE (Step S4).

Upon receiving the DN_CONNECT message, the wireless USB host transmits the MMC packet containing WCONNECTACK_IE indicating connection permission as the information element to the wireless USB device 5 (Step S5). Upon receiving the MMC packet, the wireless USB device 5 enters a connected state (non-authenticated state) with respect to the wireless USB host.

The wireless USB device 5 and the wireless USB host perform authentication with respect to each other by 4-way handshake. After the authentication is completed, the wireless USB device 5 enters the authenticated state with respect to the wireless USB host.

In the 4-way handshake, the wireless USB host first performs handshake 1, i.e., generates a random number (HNounce) and transmits the generated random number to the wireless USB device 5 (Step S6). The wireless USB device 5 then performs handshake 2, i.e., generates a random number (DNounce) and transmits the generated random number to the wireless USB host (Step S7).

At this time, the wireless USB host and the wireless USB device 5 share the HNounce, the DNounce, and the CK. The wireless USB host generates a pairwise temporal key (PTK) of 16 bytes that is to be generated as an encryption key based on the HNounce, the DNounce, and the CK (Step S8).

In the similar manner, the wireless USB device 5 generates the PTK based on the HNounce, the DNounce, and the CK (Step S9), and stores the generated PTK in the memory 31 in association with the Host Address of the wireless USB host (Step S10).

The wireless USB host performs handshake 3, i.e., transmits data encrypted with the PTK to the wireless USB device 5 (Step S11). Upon receiving the data, the wireless USB device 5 examines whether the received data has not been falsified based on the PTK thereby determining whether the wireless USB host has the authentic PTK.

The wireless USB device 5 performs handshake 4, i.e., transmits data encrypted with the PTK to the wireless USB host (Step S12). Upon receiving the data, the wireless USB host examines whether the received data has not been falsified based on the PTK thereby determining whether the wireless USB device 5 has the authentic PTK.

At the steps described below, the wireless USB host and the wireless USB device 5 transmit information encrypted with the PTK authenticated by the 4-way handshake to each other.

Upon determining that the wireless USB device 5 has the authentic PTK, the wireless USB host transmits a SET_ADDRESS device request in which a Device Address for identifying the wireless USB device 5 is set to zero to the wireless USB device 5 (Step S13). Upon receiving the SET_ADDRESS device request, the wireless USB device 5 enters the default state with respect to the wireless USB host.

The wireless USB host transmits the SET_ADDRESS device request in which the Device Address is set to a value other than zero to the wireless USB device 5 (Step S14).

Upon receiving the SET_ADDRESS device request, the wireless USB device 5 stores the Device Address set in the SET_ADDRESS device request in the memory 31 in association with the Host Address of the wireless USB host (Step S15). The wireless USB device 5 then enters the address allocated state with respect to the wireless USB host.

The wireless USB host transmits a GET_DESCRIPTOR device request for requesting a configuration descriptor among descriptors owned by the wireless USB device 5 to the wireless USB device 5 (Step S16).

Upon receiving the GET_DESCRIPTOR device request, the wireless USB device 5 transmits all configuration descriptors owned by the wireless USB device 5 to the wireless USB host (Step S17).

Each of the configuration descriptors includes bConfigurationValue for identifying the corresponding configuration descriptor in addition to information indicating settings for the configuration. The bConfigurationValue corresponds to configuration information according to the present invention.

Upon receiving the configuration descriptors, the wireless USB host transmits a SET_CONFIGURATION device request in which the bConfigurationValue included in a configuration descriptor determined among the received configuration descriptors is used as a parameter to the wireless USB device 5 (Step S18).

Upon receiving the SET_CONFIGURATION device request, the wireless USB device 5 sets the configuration for itself in accordance with the bConfigurationValue set in the received SET_CONFIGURATION device request and stores the bConfigurationValue in the memory 31 in association with the Host Address of the wireless USB host (Step S19). The wireless USB device 5 then enters the configuration state with respect to the wireless USB host.

When the state of the wireless USB device 5 transits from the configuration state to the disconnected state with respect to the wireless USB host, i.e., when a disconnection operation is performed, the wireless USB device 5 transmits a DN_DISCONNECT message indicating a disconnection request to the wireless USB host.

Upon receiving the DN_DISCONNECT message, the wireless USB host transmits the MMC packet containing WDEV_DISCONNET_IE indicating disconnection notification as the information element to the wireless USB device 5. Upon receiving the MMC packet, the wireless USB device 5 performs required processing such as disengagement of an end-point, and then enters the disconnected state with respect to the wireless USB host.

As described above, when the wireless USB device 5 receives the MMC packet containing the WHOSTINFO_IE as the information element, if the CHID included in the WHOSTINFO_IE is detected for the first time, the wireless USB device 5 stores the CHID in the memory 31 in association with the Host Address of the wireless USB host from which the MMC is transmitted.

Upon generating the PTK, the wireless USB device 5 stores the generated PTK in the memory 31 in association with the Host Address of the wireless USB host.

Furthermore, upon receiving the SET_ADDRESS device request in which the Device Address is set to a value other than zero, the wireless USB device 5 stores the Device Address in the memory 31 in association with the Host Address of the wireless USB host.

Upon receiving the SET_CONFIGURATION device request from the wireless USB host, the wireless USB device 5 stores the bConfigurationValue specified by the SET_CONFIGURATION device request in the memory 31 in association with the Host Address of the wireless USB host.

When the wireless USB device 5 is in the configuration state with respect to a wireless USB host, if the wireless USB device 5 receives the MMC packet containing the WHOSTINFO_IE as the information element from a different wireless USB host, the wireless USB device 5 enters the configuration state with respect to the different wireless USB host.

FIG. 5 is a table for explaining data about the wireless USB hosts as configuration targets stored in the memory 31. If the wireless USB device 5 receives the MMC packets each containing the WHOSTINFO_IE as the information element from the n number (n is an integer number larger than one) of wireless USB hosts, the memory 31 stores therein five values, i.e., Host Address, CHID, PTK, Device Address, and bConfigurationValue with respect to each of the wireless USB hosts.

When each of Host Address, CHID, PTK, Device Address, and bConfigurationValue is stored in the memory 31 with respect to the n-th wireless USB host, the Device Address set by the n-th wireless USB host is assigned to the wireless USB device 5, and the configuration is set in the wireless USB device 5 in accordance with the bConfigurationValue specified by the n-th wireless USB host.

Specifically, if each of Host Address, CHID, PTK, Device Address, and bConfigurationValue is stored in the memory 31 with respect to the n-th wireless USB host, the n-th wireless USB host is a configuration target for the wireless USB device 5.

Because the information element such as the WHOSTINFO_IE contained in the MMC packet is not encrypted, the wireless USB device 5 can detect the WHOSTINFO_IE even after encrypted communication with the PTK is established between the wireless USB device 5 and a wireless USB host.

Figure 6:
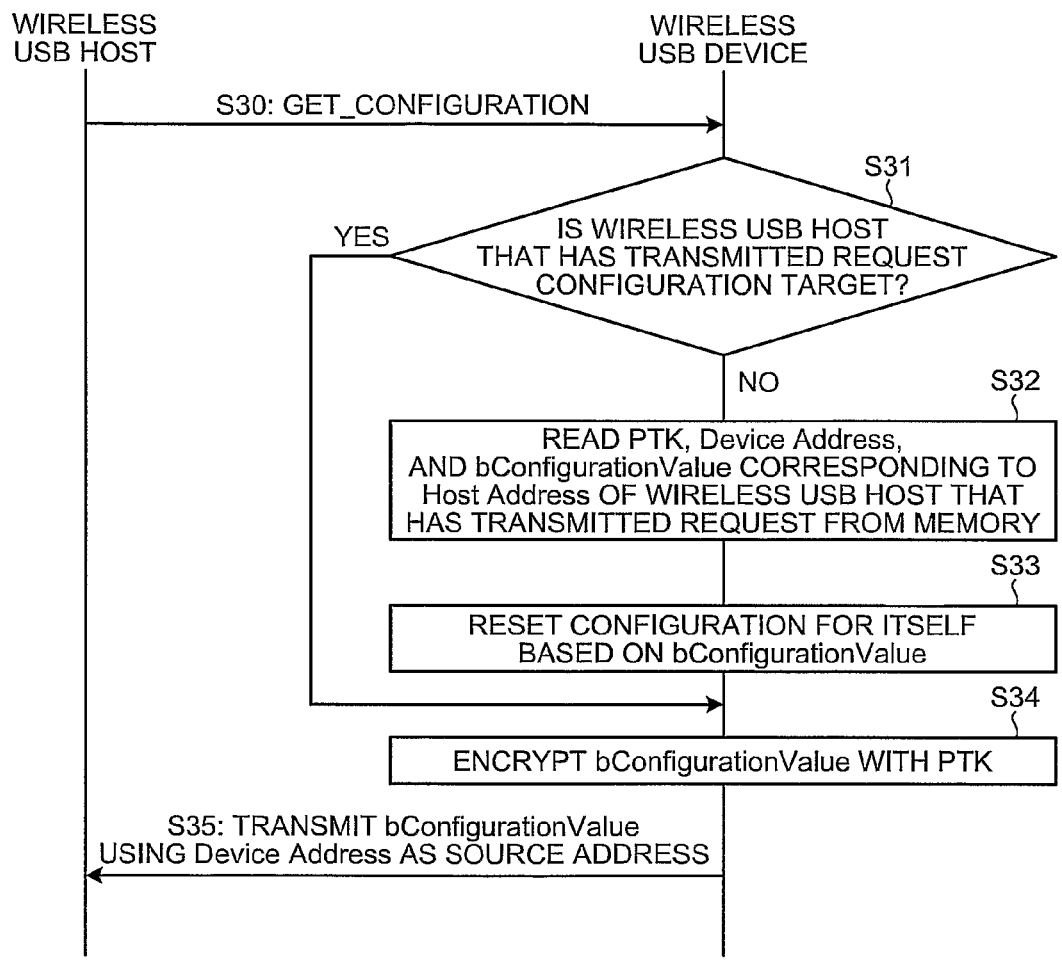
FIG. 6 is a sequence diagram for explaining an operation performed when the wireless USB host transmits a GET_CONFIGURATION device request to the wireless USB device according to the first embodiment.

FIG. 6 is a sequence diagram for explaining an operation performed when the wireless USB host transmits a GET_CONFIGURATION device request to the wireless USB device 5. The wireless USB host transmits the GET_CONFIGURATION device request defined according to the USB Specification Revision 2.0 to the wireless USB device 5 to check whether the wireless USB device 5 sets the configuration as specified by the wireless USB host with the SET_CONFIGURATION device request (Step S30). The GET_CONFIGURATION device request corresponds to configuration request information according to the present invention.

Upon receiving the GET_CONFIGURATION device request, the wireless USB device 5 determines whether the wireless USB host that has transmitted the GET_CONFIGURATION device request is the configuration target (Step S31). If it is determined that the wireless USB host that has transmitted the GET_CONFIGURATION device request is not the configuration target (No at Step S31), the wireless USB device 5 reads the PTK, the Device Address, and the bConfigurationValue corresponding to the Host Address of the wireless USB host that has transmitted the GET_CONFIGURATION device request from the memory 31 (Step S32), and resets the configuration for the wireless USB device 5 itself based on the read bConfigurationValue (Step S33).

After the wireless USB device 5 resets the configuration for the wireless USB host that has transmitted the GET_CONFIGURATION device request, the wireless USB device 5 encrypts the bConfigurationValue with the PTK (Step S34), and transmits the encrypted bConfigurationValue to the wireless USB host using the Device Address as a source address (Step S35).

If it is determined that the wireless USB host is the configuration target (Yes at Step S31), the operations are not performed at Steps S32 and S33.

The operation can be omitted at Step S33. Specifically, if the wireless USB device 5 receives the GET_CONFIGURATION device request from a wireless USB host that is not the configuration target, it is possible that the wireless USB device 5 reads the PTK, the Device Address, and the bConfigurationValue corresponding to the Host Address of the wireless USB host from the memory 31, encrypts the bConfigurationValue with the PTK, and transmits the encrypted bConfigurationValue to the wireless USB host using the Device Address as a source address without resetting the configuration for the wireless USB device 5 itself.

In such a case, the wireless USB device 5 also can cause the wireless USB host that receives the bConfigurationValue to acknowledge that the wireless USB device 5 sets the configuration as specified by the wireless USB host.

Therefore, for example, when the PC as the wireless USB host causes the printer as the wireless USB device 5 to print out an image, it is possible to prevent the PC from displaying an error message because the PC recognizes that the printer has not set the configuration as specified by the PC thereby determining that the printer is not in an enabled state.

According to the Wireless USB Specification Revision 1.0, before the wireless USB host transmits data to a wireless USB device, the wireless USB host transmits the MMC packet containing WDRCTA_IE indicating which wireless USB device is a destination and when the data is to be transmitted to the wireless USB device (i.e., when the wireless USB device is to receive the data) as the information element to the wireless USB device. The WDRCTA_IE corresponds to reception time information according to the present invention.

Figure 7:
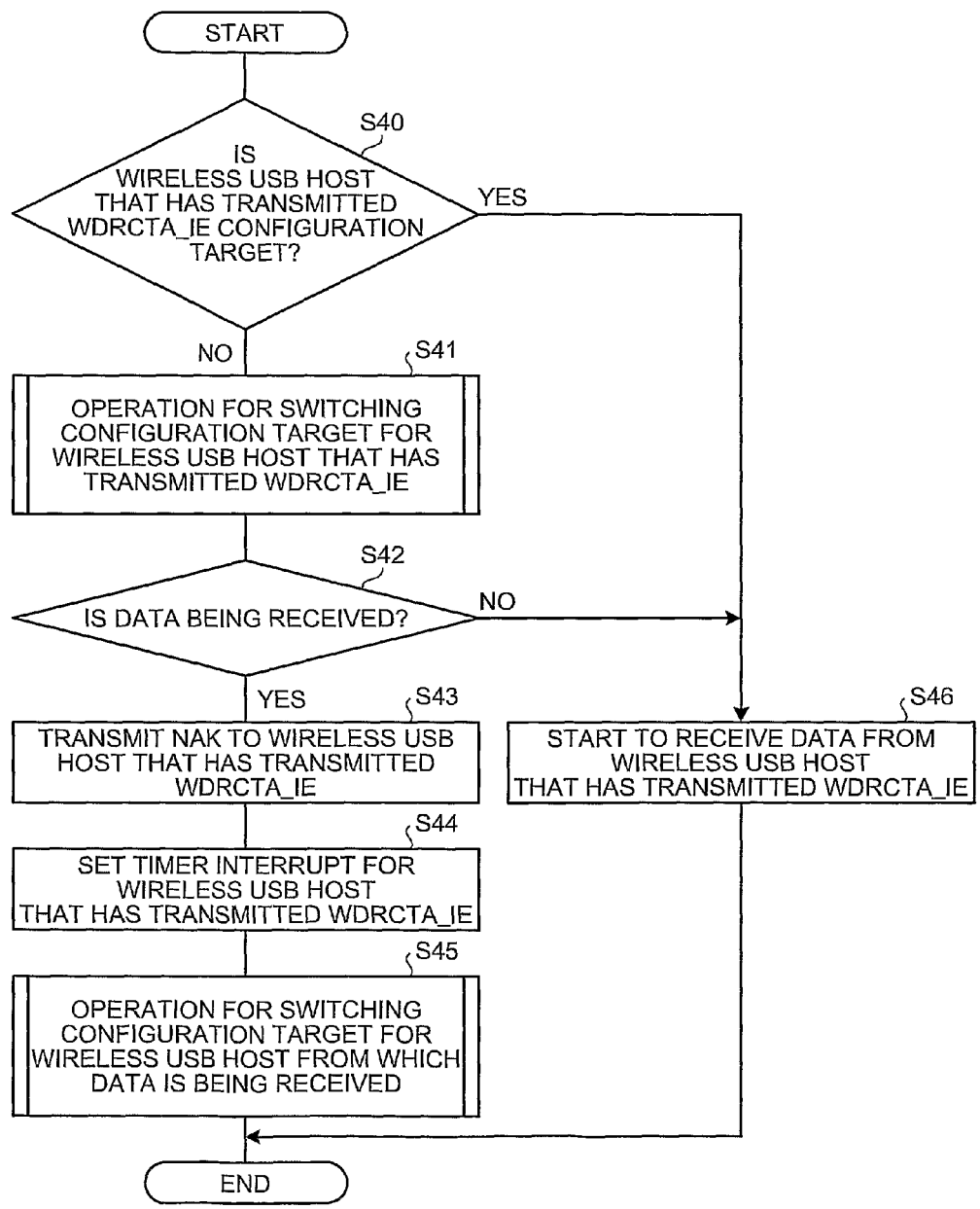
FIG. 7 is a flowchart of a response operation performed when the wireless USB device receives an MMC packet containing WDRCTA_IE as an information element from a wireless USB host from which data is not being received according to the first embodiment.

FIG. 7 is a flowchart of a response operation performed when the wireless USB device 5 receives the MMC packet containing the WDRCTA_IE as the information element from a wireless USB host from which data is not being received.

The wireless USB device 5 determines whether the wireless USB host (hereinafter, "the wireless USB host 1") that has transmitted the MMC packet containing the WDRCTA_IE as the information element is the configuration target based on the Host Address of the wireless USB host 1 (Step S40).

If it is determined that the wireless USB host 1 is not the configuration target (No at Step S40), the wireless USB device 5 performs an operation for switching the configuration target for the wireless USB host 1 so that the wireless USB host 1 becomes the configuration target (Step S41).

Figure 8:
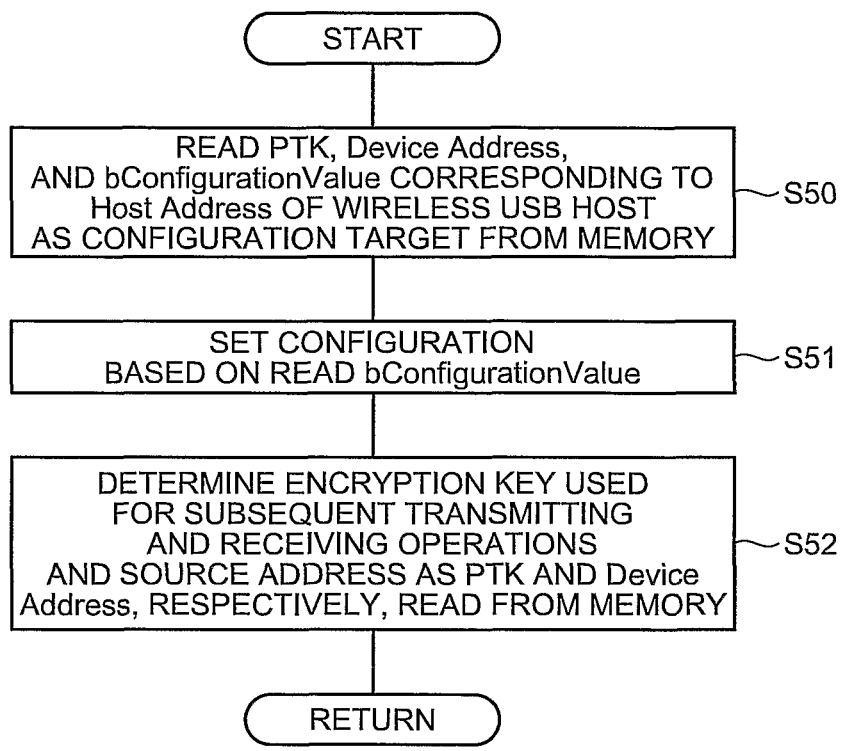
FIG. 8 is a flowchart of an operation performed by the wireless USB device for switching the configuration target according to the first embodiment.

FIG. 8 is a flowchart of the operation performed by the wireless USB device 5 for switching the configuration target. The wireless USB device 5 reads the PTK, the Device Address, and the bConfigurationValue corresponding to the Host Address of the wireless USB host 1 as the configuration target from the memory 31 (Step S50).

The wireless USB device 5 then sets the configuration for itself based on the read bConfigurationValue (Step S51). The wireless USB device 5 determines an encryption key used for subsequent transmitting and receiving operations and a source address as the PTK and the Device Address, respectively, read from the memory 31 (Step S52), terminates the operation for switching the configuration target, and returns to its invoker.

As shown in FIG. 7, when the wireless USB host 1 becomes the configuration target, the wireless USB device 5 determines whether data is being received from any of the wireless USB hosts 2 to 4 (Step S42).

Specifically, the wireless USB device 5 determines that the data is being received if the wireless USB device 5 has received the WDRCTA_IE from any of the wireless USB hosts 2 to 4 and if, after receiving first WDRCTA_IE, the wireless USB device 5 has received second WDRCTA_IE from the wireless USB host before a predetermined time elapses.

If it is determined that the data is being received from any of the wireless USB hosts 2 to 4 (Yes at Step S42), the wireless USB device 5 transmits a NAK packet indicating that the wireless USB device 5 is not in a state where the wireless USB device 5 can properly receive data to the wireless USB host 1 (Step S43).

Upon receiving the NAK packet, the wireless USB device 5 sets timer interrupt for the wireless USB host 1 (Step S44).

When the wireless USB device 5 sets the timer interrupt, the wireless USB device 5 performs the operation for switching the configuration target for the wireless USB host from which the data is being received so that the wireless USB host becomes the configuration target (Step S45), and terminates the response operation.

If it is determined that the wireless USB host 1 is the configuration target (Yes at Step S40), or if it is determined that data is not being received from any of the wireless USB hosts 2 to 4 (No at Step S42), the wireless USB device 5 starts to receive data from the wireless USB host 1 (Step S46), and terminates the response operation.

Figure 9:
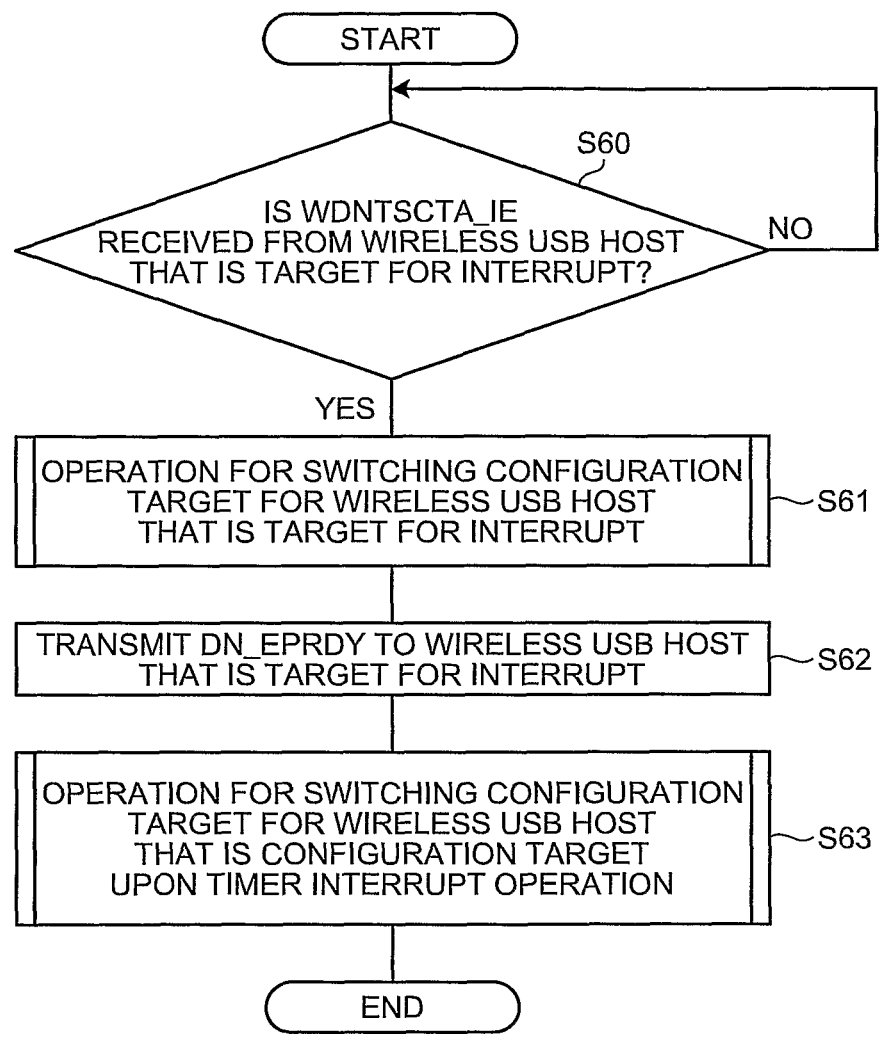
FIG. 9 is a flowchart of a timer interrupt operation performed by the wireless USB device according to the first embodiment.

FIG. 9 is a flowchart of a timer interrupt operation performed by the wireless USB device 5. If the timer interrupt set at Step S44 starts, the wireless USB device 5 waits for receiving the MMC packet containing the WDNTSCTA_IE as the information element from the wireless USB host 1 that is the target for the timer interrupt (No at Step S60).

If the wireless USB device 5 receives the MMC packet containing the WDNTSCTA_IE as the information element from the wireless USB host 1 (Yes at Step S60), the wireless USB device 5 performs the operation for switching the configuration target for the wireless USB host 1 so that the wireless USB host 1 becomes the configuration target (Step S61).

The wireless USB device 5 transmits a DN_EPRDY message indicating that the wireless USB device 5 is in a state where the wireless USB device 5 can properly receive data to the wireless USB host 1 at a time indicated by the WDNTSCTA_IE (Step S62).

Upon transmitting the DN_EPRDY message, the wireless USB device 5 performs the operation for switching the configuration target for the wireless USB host that is the configuration target upon the timer interrupt operation so that the wireless USB host becomes the configuration target (Step S63), and terminates the timer interrupt operation.

As described above, if the wireless USB device 5 has not set the configuration for the wireless USB host that has transmitted the MMC packet containing the WDRCTA_IE as the information element, the wireless USB device 5 sets the configuration for the wireless USB host. Thus, it is possible to prevent mismatch of the configuration in the wireless USB device 5 with respect to each of the wireless USB hosts 1 to 4 without increasing a circuit size in the wireless USB device 5.

A wireless USB communication system according to a second embodiment of the present invention is achieved by modifying the firmware 36 to be executed by the sub CPU 30 in the wireless USB communication system according to the first embodiment.

The wireless USB communication system according to the second embodiment has the configuration as shown in FIG. 1, and the wireless USB device 5 according to the second embodiment has the configuration as shown in FIG. 2.

In the second embodiment, the MAC unit 32, the PHY unit 33, and the antenna 54 correspond to a reception-time-information receiving unit according to the present invention. As described below, the sub CPU 30 executing the firmware 36 operates the wireless USB device 5 and corresponds to the configuration determining unit, the configuration unit, and the host standby unit.

Although the state transition of the wireless USB device 5 to perform communication with the wireless USB host is achieved as shown in FIG. 3, the operations performed at Steps S2, S10, S15, and S19 as shown in FIG. 4 are omitted when the state of the wireless USB device 5 transits from the disconnected state to the configuration state with respect to the wireless USB host.

Specifically, the wireless USB device 5 does not store the Host Address, the CHID, the PTK, the Device Address, and the bConfigurationValue in the memory 31 with respect to each of the wireless USB hosts, and sets the configuration in accordance with the bConfigurationValue specified by the wireless USB host that is the last configuration target.

Figure 10:
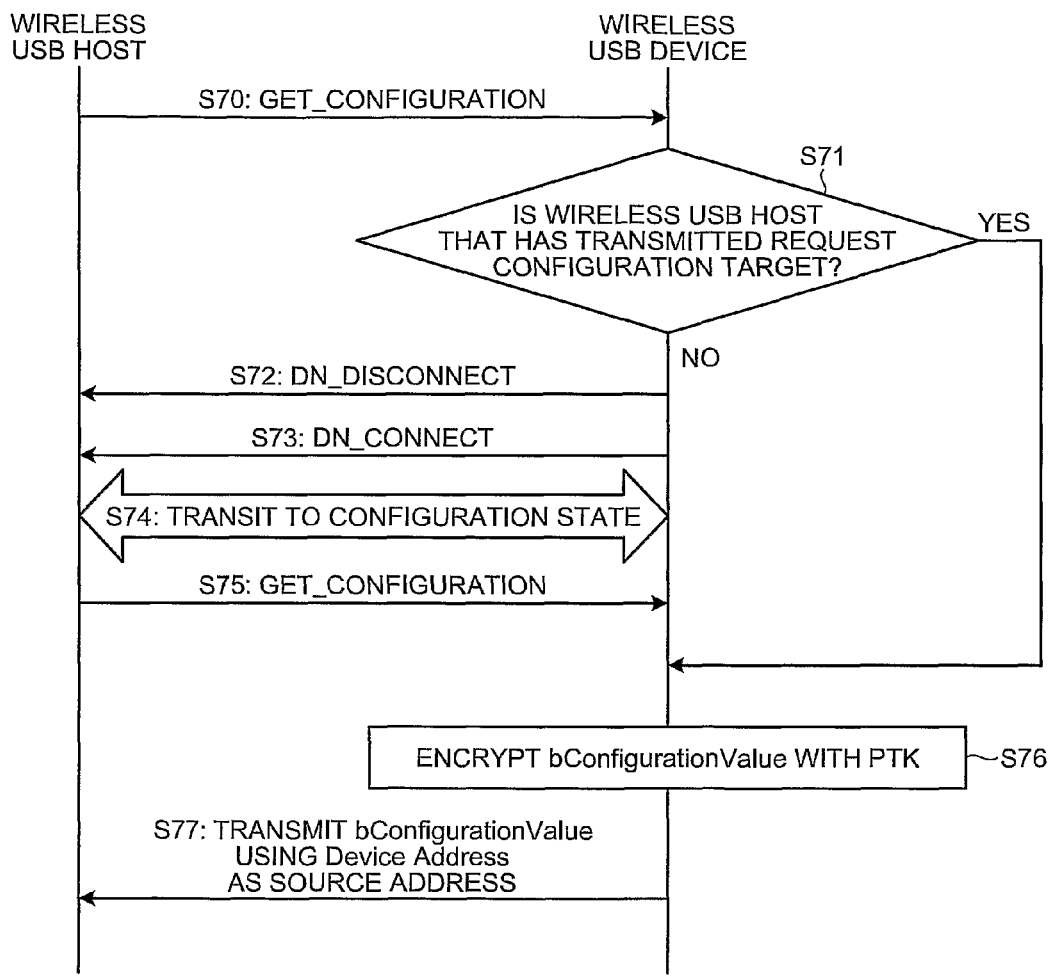
FIG. 10 is a sequence diagram for explaining an operation performed when the wireless USB host transmits the GET_CONFIGURATION device request to the wireless USB device according to a second embodiment of the present invention.

FIG. 10 is a sequence diagram for explaining an operation performed when the wireless USB host transmits the GET_CONFIGURATION device request to the wireless USB device 5 according to the second embodiment.

When the wireless USB host transmits the GET_CONFIGURATION device request to the wireless USB device 5 (Step S70), the wireless USB device 5 determines whether the wireless USB host that has transmitted the GET_CONFIGURATION device request is the configuration target (Step S71).

If it is not determined that the wireless USB host that has transmitted the GET_CONFIGURATION device request is the configuration target (No at Step S71), the wireless USB device 5 transmits the DN_DISCONNECT message to the wireless USB host (Step S72).

The wireless USB device 5 then transmits the DN_CONNECT message to the wireless USB host (Step S73). Thus, as described above, the state of the wireless USB device 5 transits to the configuration state with respect to the wireless USB host that has transmitted the GET_CONFIGURATION device request in conformity to the Wireless USB Specification Revision 1.0 (Step S74).

If the wireless USB host receives the DN_DISCONNECT message from the wireless USB device 5 after transmitting the GET_CONFIGURATION device request, the wireless USB host retransmits the GET_CONFIGURATION device request the next time the wireless USB device 5 sets the configuration. This is achieved by installing an application-level driver for the wireless USB device 5 in the wireless USB host.

The wireless USB host retransmits the GET_CONFIGURATION device request to the wireless USB device 5 (Step S75).

If it is determined that the wireless USB host is the configuration target (Yes at Step S71), the operations are not performed at Steps S72 to S75.

After the wireless USB device 5 sets the configuration with respect to the wireless USB host that has transmitted the GET_CONFIGURATION device request, the wireless USB device 5 encrypts the bConfigurationValue with the PTK (Step S76), and transmits the encrypted bConfigurationValue to the wireless USB host using the Device Address as a source address (Step S77).

FIGS. 11 to 14 are flowcharts of a response operation performed when the wireless USB device 5 receives the MMC packet containing the WDRCTA_IE as the information element from a wireless USB host from which data is not being received.

Figure 11:
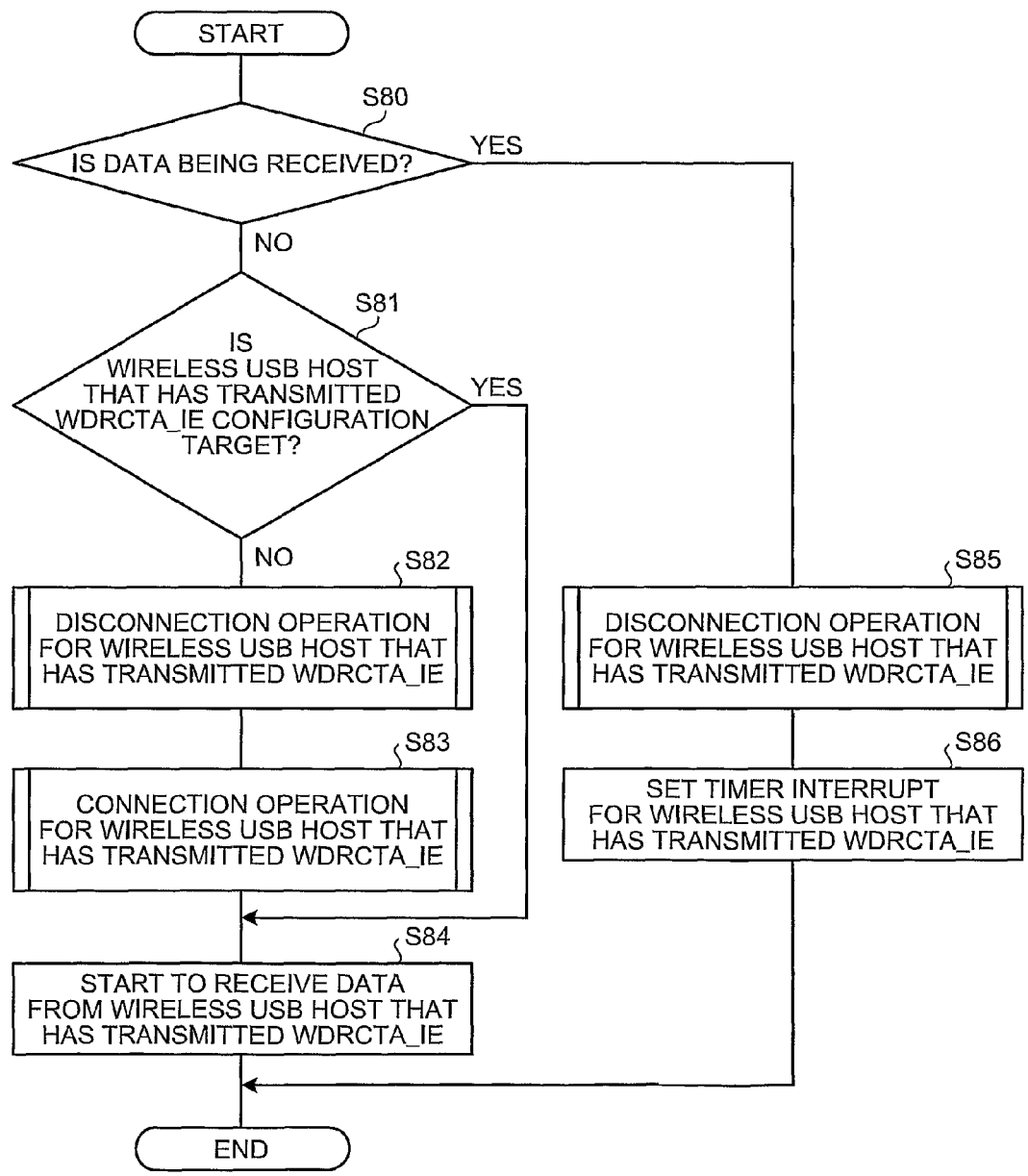
FIGS. 11 to 14 are flowcharts of a response operation performed when the wireless USB device receives the MMC packet containing the WDRCTA_IE as the information element from a wireless USB host from which data is not being received.

As shown in FIG. 11, upon receiving the MMC packet containing the WDRCTA_IE as the information element from the wireless USB host (hereinafter, "the wireless USB host 1"), the wireless USB device 5 determines whether data is being received from any of the wireless USB hosts 2 to 4 (Step S80).

If it is not determined that the data is being received from any of the wireless USB hosts 2 to 4 (No at Step S80), the wireless USB device 5 determines whether the wireless USB host 1 is the configuration target (Step S81).

If it is not determined that the wireless USB host 1 is the configuration target (No at Step S81), the wireless USB device 5 performs the disconnection operation for the wireless USB host 1 (Step S82).

Figure 12:
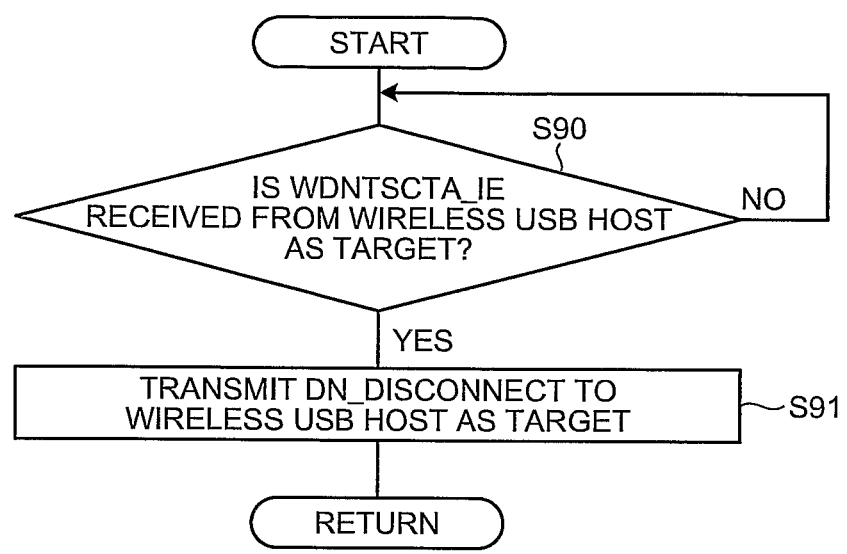

In the disconnection operation as shown in FIG. 12, the wireless USB device 5 waits for receiving the MMC packet containing the WDNTSCTA_IE as the information element from the wireless USB host 1 as a target (No at Step S90).

Upon receiving the MMC packet containing the WDNTSCTA_IE as the information element from the wireless USB host 1 (Yes at Step S90), the wireless USB device 5 transmits the DN_DISCONNECT message to the wireless USB host 1 (Step S91), terminates the disconnection operation, and returns to its invoker. The wireless USB host 1 then recognizes that the wireless USB device 5 enters the disconnected state.

As shown in FIG. 11, the wireless USB device 5 performs the connection operation for the wireless USB host 1 (Step S83).

If it is determined that the wireless USB host 1 is the configuration target (Yes at Step S81), the operations are not performed at Steps S82 and S83.

Figure 13:
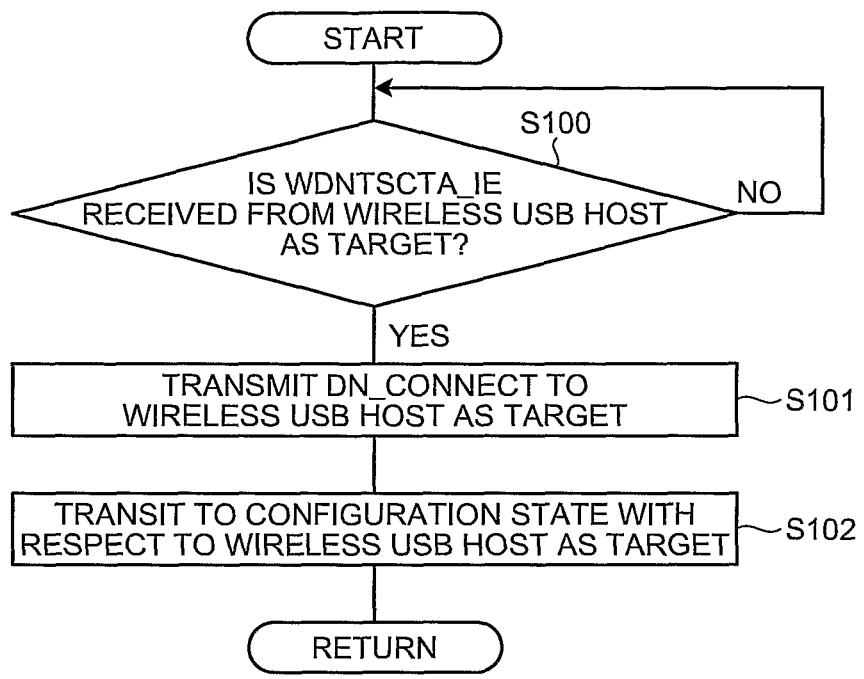

In the connection operation as shown in FIG. 13, the wireless USB device 5 waits for receiving the MMC packet containing the WDNTSCTA_IE as the information element from the wireless USB host 1 as a target (No at Step S100).

If the wireless USB device 5 receives the MMC packet containing the WDNTSCTA_IE as the information element from the wireless USB host 1 (Yes at Step S100), the wireless USB device 5 transmits the DN_CONNECT message to the wireless USB host 1 (Step S101). Thus, as described above, the state of the wireless USB device 5 transits to the configuration state with respect to the wireless USB host 1 (Step S102). The wireless USB device 5 then terminates the connection operation and returns to its invoker.

As shown in FIG. 11, the wireless USB device 5 that is in the configuration state with respect to the wireless USB host 1 starts to receive data from the wireless USB host 1 (Step S84), and terminates the response operation.

If it is determined that data is being received from any of the wireless USB hosts 2 to 4 (Yes at Step S80), the wireless USB device 5 performs the disconnection operation for the wireless USB host 1 (Step S85).

Figure 14:
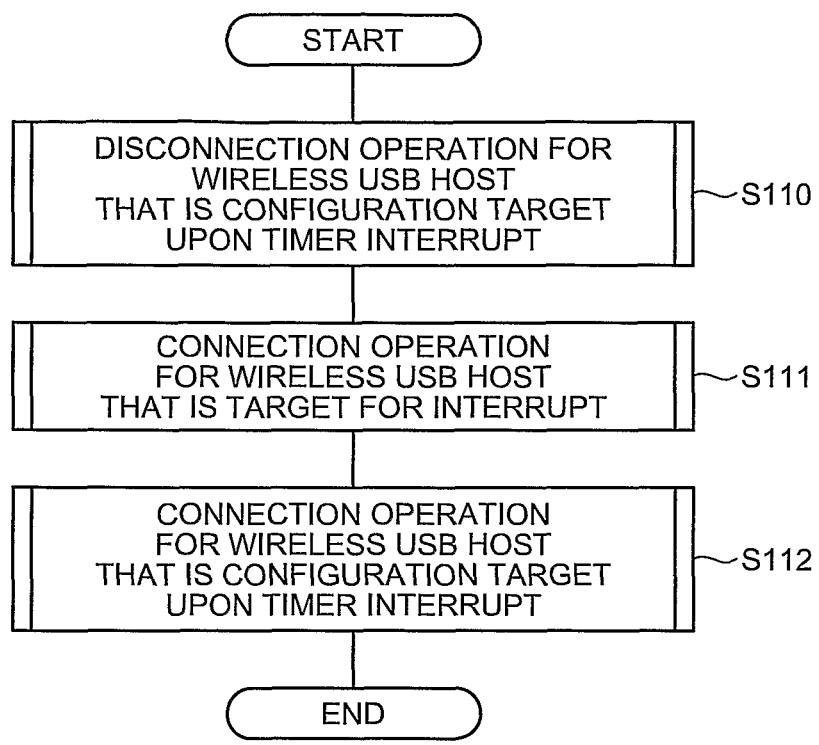

The wireless USB device 5 then sets the timer interrupt for the wireless USB host 1 (Step S86), and terminates the response operation. When the set timer interrupt starts, as shown in FIG. 14, the wireless USB device 5 performs the disconnection operation for the wireless USB host that is the configuration target upon the timer interrupt (Step S110).

The wireless USB device 5 performs the connection operation for the wireless USB host 1 that is a target for the timer interrupt (Step S111). Thus, the wireless USB host 1 enters a state where the wireless USB host 1 can transmit the MMC packet containing the WDNTSCTA_IE as the information element.

The wireless USB device 5 performs the connection operation for the wireless USB host that is the configuration target upon the timer interrupt (Step S112), and terminates the timer interrupt operation.

If the wireless USB host receives the DN_DISCONNECT message from the wireless USB device 5 after transmitting the MMC packet containing the WDNTSCTA_IE as the information element, the wireless USB host retransmits the MMC packet and data to the wireless USB device 5 the next time the wireless USB device 5 sets the configuration. This is achieved by installing an application-level driver for the wireless USB device 5 in the wireless USB host.

As described above, in the same manner as the wireless USB communication system according to the first embodiment, if the wireless USB device 5 has not set the configuration for the wireless USB host that has transmitted the MMC packet containing the WDRCTA_IE as the information element, the wireless USB device 5 sets the configuration for the wireless USB host. Thus, it is possible to prevent mismatch of the configuration in the wireless USB device 5 with respect to each of the wireless USB hosts 1 to 4 without increasing a circuit size in the wireless USE device 5.

The invention claimed is:

1. A wireless universal-serial-bus device that performs a communication conforming to a wireless universal-serial-bus standard with a plurality of wireless universal-serial-bus hosts, the wireless universal-serial-bus device comprising:
   a reception-time-information receiving unit that receives reception time information indicating a data reception time specified by each of the wireless universal-serial-bus hosts, and when the reception-time-information receiving unit receives the reception time information from one wireless universal-serial-bus host, the reception-time-information receiving unit determines whether or not data is being received from another wireless universal-serial-bus host;
   a configuration determining unit that determines, when the reception-time-information receiving unit receives the reception time information from the one wireless universal-serial-bus host, and determines that no data is being received from the another wireless universal-serial-bus host, whether a configuration is set for the one wireless universal-serial-bus host that transmitted the reception time information; and
   a configuration unit that sets, when the configuration determining unit determines that the configuration has not been set for the one wireless universal-serial-bus host that transmitted the reception time information, the configuration for the one wireless universal-serial-bus host that transmitted the reception time information.

2. The wireless universal-serial-bus device according to claim 1, further comprising a configuration-information storage unit that stores therein configuration information for setting the configuration, in association with each of the wireless universal-serial-bus hosts, wherein
   the configuration unit sets the configuration based on the configuration information stored in the configuration-information storage unit.

3. The wireless universal-serial-bus device according to claim 2, further comprising:

a configuration-request information receiving unit that receives configuration request information indicating a request for the configuration information from each of the wireless universal-serial-bus hosts; and a configuration-information reply unit that replies, when the configuration-request information receiving unit receives the configuration request information from a wireless universal-serial-bus host, to the wireless universal-serial-bus host that transmitted the configuration request information with the configuration information stored in the configuration-information storage unit corresponding to the wireless universal-serial-bus host that transmitted the configuration request information.

4. The wireless universal-serial-bus device according to claim 3, wherein the configuration determining unit further determines whether the configuration is set for the wireless universal-serial-bus host that transmitted the configuration request information before the configuration-information reply unit replies to the wireless universal-serial-bus host that transmitted the configuration request information, and when the configuration determining unit determines that the configuration is not set for the wireless universal-serial-bus host that transmitted the configuration request information, the configuration unit sets the configuration for the wireless universal-serial-bus host that transmitted the configuration request information.

5. The wireless universal-serial-bus device according to claim 3, further comprising an encrypting unit that encrypts the configuration information with an encryption key corresponding to the wireless universal-serial-bus host that transmitted the configuration request information, wherein the configuration-information reply unit replies to the wireless universal-serial-bus host that transmitted the configuration request information with the configuration information encrypted by the encrypting unit.

6. The wireless universal-serial-bus device according to claim 1, further comprising:

a data receiving unit that receives data from each of the wireless universal-serial-bus hosts; and a host standby unit that causes, when the reception-time-information receiving unit receives the reception time information from a first wireless universal-serial-bus host while the data receiving unit receives data from a second wireless universal-serial-bus host, the first wireless universal-serial-bus host to standby until the data receiving unit completes receiving the data from the second wireless universal-serial-bus host.

7. The wireless universal-serial-bus device according to claim 6, wherein the host standby unit causes the first wireless universal-serial-bus host to standby by transmitting information indicating that the reception time information is not properly received to the first wireless universal-serial-bus host.

8. The wireless universal-serial-bus device according to claim 6, wherein the host standby unit causes the first wireless universal-serial-bus host to standby by transmitting first information indicating a state in which the reception time information cannot be properly received and second information indicating a state in which the reception time information can be properly received to the first wireless universal-serial-bus host.

9. The wireless universal-serial-bus device according to claim 8, further comprising a transmission-time-information receiving unit that receives transmission time information indicating a data transmission time specified by each of the wireless universal-serial-bus hosts, wherein the host standby unit transmits the second information to the first wireless universal-serial-bus host at the data transmission time indicated by the transmission-time information received by the transmission-time-information receiving unit.

10. The wireless universal-serial-bus device according to claim 6, wherein the host standby unit causes the first wireless universal-serial-bus host to standby by alternately repeating a connection operation and a disconnection operation for a communication with the first wireless universal-serial-bus host.

11. The wireless universal-serial-bus device according to claim 10, wherein the host standby unit performs the connection operation when a predetermined time elapses after performing the disconnection operation.

12. The wireless universal-serial-bus device according to claim 1, further comprising a host detecting unit that detects the wireless universal-serial-bus hosts, wherein the host detecting unit stores identification information for identifying a detected wireless universal-serial-bus host in association with a host address of the detected wireless universal-serial-bus host in a storage medium.

13. The wireless universal-serial-bus device according to claim 1, further comprising a host authenticating unit that authenticates the wireless universal-serial-bus hosts and generates an encryption key shared with each of the wireless universal-serial-bus hosts, wherein the host authenticating unit stores identification information for identifying an authenticated wireless universal-serial-bus host in association with the encryption key in a storage medium.

14. The wireless universal-serial-bus device according to claim 1, further comprising a device-address receiving unit that receives a device address assigned by each of the wireless universal-serial-bus hosts, wherein the device-address receiving unit stores identification information for identifying each of the wireless universal-serial-bus hosts in association with the device address corresponding to each of the wireless universal-serial-bus hosts in a storage medium.

15. A wireless universal-serial-bus communication system comprising:

a plurality of wireless universal-serial-bus hosts; and a wireless universal-serial-bus device that performs a communication conforming to a wireless universal-serial-bus standard with the wireless universal-serial-bus hosts, wherein the wireless universal-serial-bus device includes a reception-time-information receiving unit that receives reception time information indicating a data reception time specified by each of the wireless universal-serial-bus hosts, a configuration determining unit that determines, when the reception-time-information receiving unit receives the reception time information from a wireless universal-serial-bus host, whether a configuration is set for the wireless universal-serial-bus host that transmitted the reception time information, a configuration unit that sets, when the configuration determining unit determines that the configuration is not set for the wireless universal-serial-bus host that transmitted the reception time information, the configuration for the wireless universal-serial-bus host that transmitted the reception time information, a data receiving unit that receives data from each of the wireless universal-serial-bus hosts, and a host standby unit that causes, when the reception-time-information receiving unit receives the reception time information from a first wireless universal-serial-bus host while the data receiving unit receives data from a second wireless universal-serial-bus host, the first wireless universal-serial-bus host to standby until the data receiving unit completes receiving the data from the second wireless universal-serial-bus host, wherein the first wireless universal-serial-bus host holds data to be transmitted to the wireless universal-serial-bus device while the host standby unit causes the first wireless universal-serial-bus host to standby.

* * * * *